(12) United States Patent
Shen et al.

(10) Patent No.: US 10,481,305 B2
(45) Date of Patent: Nov. 19, 2019

(54) VISIBLE NEAR-INFRARED ULTRA-BROADBAND ABSORBER AND ITS PREPARATION METHOD

(71) Applicant: ZHEJIANG UNIVERSITY, Hangzhou, Zhejiang Province (CN)

(72) Inventors: Weidong Shen, Hangzhou (CN); Chenying Yang, Hangzhou (CN); Yueguang Zhang, Hangzhou (CN); Bo Fang, Hangzhou (CN); Xu Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 154 days.

(21) Appl. No.: 15/329,569

(22) PCT Filed: Sep. 21, 2015

(86) PCT No.: PCT/CN2015/090201
§ 371 (c)(1),
(2) Date: Jan. 26, 2017

(87) PCT Pub. No.: WO2017/020407
PCT Pub. Date: Feb. 9, 2017

(65) Prior Publication Data
US 2017/0242162 A1 Aug. 24, 2017

(30) Foreign Application Priority Data

Aug. 4, 2015 (CN) .......................... 2015 1 0469463
Aug. 4, 2015 (CN) .......................... 2015 1 0470432

(51) Int. Cl.
*B32B 7/02* (2019.01)
*G02B 5/00* (2006.01)
(Continued)

(52) U.S. Cl.
CPC ................ *G02B 5/003* (2013.01); *B32B 9/00* (2013.01); *B32B 15/00* (2013.01); *G02B 1/115* (2013.01)

(58) Field of Classification Search
CPC ........... B32B 15/00; B32B 9/00; G02B 1/115; G02B 5/003
See application file for complete search history.

(56) References Cited

PUBLICATIONS

Liu et al, CN 204345956, May 20. (Year: 2015).*

\* cited by examiner

*Primary Examiner* — Lawrence D Ferguson
(74) *Attorney, Agent, or Firm* — Jiwen Chen

(57) ABSTRACT

The present invention discloses a visible near-infrared ultra-broadband absorber and its preparation method, comprising a substrate and a five-layer optical film, wherein the bottom film is a bottom metal absorbing layer; a top germanium layer is provided on the top of the bottom metal absorbing layer; and remaining three layers are provided on the top of the top germanium layer with gradually decreasing refractive indexes from the bottom to the top. The present invention is based on the blocking effect of the metal absorbing layer and broadband anti-reflection film stack of the germanium layer, which has realized visible near-infrared ultra-broadband absorption with high efficiency and good angle insensitivity, and has fully surpassed traditional absorbers in terms of performances. Compared with conventional broadband absorbers and artificial electromagnetic absorbers proposed in recent years, the compact multilayer film structure in the present invention is simpler and avoids complicated nano-fabrication techniques. Therefore, it can significantly reduce production cost and shorten the production cycle, and is thus suitable for large-scale mass production.

15 Claims, 7 Drawing Sheets

(51) Int. Cl.
*B32B 9/00* (2006.01)
*B32B 15/00* (2006.01)
*G02B 1/115* (2015.01)

VISIBLE NEAR-INFRARED ULTRA-BROADBAND ABSORBER AND ITS PREPARATION METHOD

This is a U.S. national stage application of PCT Application No. PCT/CN2015/090201 under 35 U.S.C. 371, filed Sep. 21, 2015 in Chinese, claiming priority of Chinese Application No. 201510469463.7, filed Aug. 4, 2015 and Chinese Application No. 201510470432.3, filed Aug. 4, 2015, all of which are hereby incorporated by reference.

FIELD OF THE INVENTION

The present invention is related to such fields as elimination of stray light, space exploration, imaging, photothermal conversion and electromagnetic absorption, in particular to a visible near-infrared ultra-broadband absorber.

BACKGROUND OF THE INVENTION

As the visible near-infrared broadband absorber plays an important role in numerous different new fields, more and more ultra-broadband absorbers have been developed in recent years based on extensive study. In recent years, researchers have proposed various near-infrared electromagnetic wave absorbers with artificial electromagnetic structure. Among them, Chen et al. have produced gold nanorod in random arrangement on the metal substrate coated with a dielectric layer by means of droplet evaporation, and thereby realized high absorption at the near-infrared broadband of 900 nm-1600 nm (Near-infrared broadband absorber with film-coupled multilayer nanorods, Optics Lett. 38, 2247-2249 (2013)); Zhou et al. have realized high absorption at near-infrared broadband by preparing a conical structure of multilayer alternating medium/metal by means of lateral deposition (Experiment and Theory of the Broadband Absorption by a Tapered Hyperbolic Metamaterial Array, ACS Photonics 1, 618-624 (2014)); Ji et al. have proposed a structure comprised of alternating accumulation of metallic particles and silicon oxide film on the surface of silver reflector, and thereby realized high absorption above 96% on average at the waveband of 300nm-1100nm (Plasmonic broadband absorber by stacking multiple metallic nanoparticle layers, Appl. Phys. Lett. 106, 161107 (2015)).

However, the aforesaid preparation methods are complicated and time-consuming with high cost, and thus are not suitable for large-scale mass production.

Relevant available literatures are stated as follows:

Chinese Patent Application No. 201510163240.8 has disclosed an ultra-broadband absorber of meta-material based on the cascade architecture; such absorber comprises 9 medium layers and 9 metal layers; the medium layer and metal layer 1-3 comprise cylinders of the same diameter; the medium layer and metal layer 4-6 comprise cylinders of the same diameter; the medium layer and metal layer 7-9 comprise cylinders of the same diameter; and overall structure of such absorber is relatively complicated with higher requirements on the incidence angle.

Chinese Patent Application No. 201410020841.9 has disclosed a structure for visible near-infrared broadband absorption film which produces a metal film layer and medium film layer on any substrates by means of vapor deposition and liquid deposition in proper sequence; wherein, thickness of the metal film layer and the medium film layer is 80 nm-1 μm and 1 nm-200 nm respectively; in the disordered distribution layer of metallic particles, average height of the equivalent film layer is 5 nm-100 nm with average particle size up to 10 nm-200 nm; and surface coverage of metallic particles is 3%-90%. The structure is relatively simple but its absorption is unsatisfactory.

Chinese Patent Application No.201110410712.7 has disclosed a selective solar absorption coat which comprises a two-layer or three-layer structure: the first layer is a polished stainless steel substrate; the second layer is a Cu1.5Mn1.5O4 composite oxide absorption layer; and the third layer is an anti-reflection layer composed of TiO2 film from bottom to top. The absorption of the coating below 0.9 and the preparation process is complicated.

SUMMARY OF THE INVENTION

The present invention is related to a visible near-infrared ultra-broadband absorber which has wider absorption band, better absorption performance and good incidence angle insensitivity.

The present invention further provides a preparation method for the visible near-infrared ultra-broadband absorber with convenient preparation and low cost, and thus is suitable for large-scale mass production.

A visible near-infrared ultra-broadband absorber, comprising a substrate, is characterized in that a bottom metal absorbing layer, a top germanium layer and a three-layer broadband anti-reflection coating are provided in proper order on the substrate; and the three-layer broadband anti-reflection coating respectively comprises a bottom layer, an intermediate layer and an outmost layer on the top germanium layer in proper sequence with gradually decreasing refractive indexes.

The followings are preferred solutions based on aforesaid solution:

It is preferred that the alternating film stack of the germanium/metal absorbing layers is provided between the bottom metal absorbing layer and the top germanium layer; the alternating film stack of the germanium/metal absorbing layers comprises one or several germanium/metal absorbing layer units and the germanium layer is arranged close to the bottom metal absorbing layer.

There is no limitation on material of the substrate. It is preferred that the substrate is selected from K9, fused silica, float glass and other glass materials, or silicon, gallium arsenide and other semiconducting materials. It is further preferred that it is silicon wafer.

It is preferred that the bottom metal absorbing layer can be selected from chromium, titanium, iridium, tungsten, nickel and their alloy; the metal absorbing layer in the alternating film layer for the germanium/metal absorbing layer can be selected from chromium, titanium, iridium, tungsten, nickel and their alloy; it is further preferred that the metal absorbing layer in the alternating film layer for the germanium/metal absorbing layer is selected from the same material; and it is further more preferred that the bottom metal absorbing layer can be chromium. The thickness of the bottom metal absorbing layer shall be greater than or equal to 100 nm; it is further preferred that it is 100 nm-500 nm; and it is further more preferred that it is 150 nm-300 nm.

It is preferred that the thickness of the top germanium layer is 10 nm-40 nm; and it is further preferred that it is 20 nm-40 nm.

It is preferred that the refractive indexes of the material for the three-layer broadband anti-reflection coating are gradually decreasing from the bottom to the top; silicon is selected as the bottom film close to the top germanium layer with a thickness of 10 nm-40 nm which is further preferred to be 15 nm-40 nm and further more preferred as 30 nm-40 nm; the intermediate film layer can be selected from such high refractive index medium materials as titanium dioxide, hafnium oxide, tantalum oxide and silicon nitride, with a thickness of 30 nm-80 nm which is further preferred to be 35 nm-60 nm; the outmost film layer can be selected from such low refractive index medium materials as magnesium fluoride, silicon dioxide and yttrium fluoride with a thickness of 70 nm-130 nm which is further preferred to be 80 nm-120 nm and further more preferred to be 100 nm-120 nm. It is preferred that silicon, titanium dioxide and magnesium fluoride can be selected for the three-layer broadband anti-reflection film layer in the present invention from the bottom to the top.

It is preferred that the alternating film stack of the germanium/metal absorbing layer comprises one or more germanium/metal absorbing layer units, wherein the germanium layer is arranged close to the bottom metal absorbing layer which can be represented as (germanium/metal absorbing layer)$^S$, wherein S is an integral ≥1. It is preferred that the thickness of each layer of the alternating film layer for the germanium/metal absorbing layer is 10 nm-80 nm; and it is further preferred that thickness of the germanium layer in the alternating film layer for the germanium/metal absorbing layer is 33 nm-80 nm. The metal absorbing layer in the alternating film layer for the germanium/metal absorbing layer can be selected from chromium, titanium, iridium, tungsten, nickel and their alloy; and it is further preferred that the metal absorbing layer in the alternating film layer for the germanium/metal absorbing layer can be selected from chromium and titanium; thickness of the metal absorbing layer in the alternating film layer for the germanium/metal absorbing layer is 10 nm-40 nm; and it is preferred to be 15 nm-30 nm. It is preferred that S is 1 or 2 or 3. The thickness of the germanium layer for the germanium/metal absorbing layer units can be identical or different; and the thickness of the metal absorbing layer can be identical or different, which can be adjusted based on practical demands.

The present invention further relates to a preparation method for the visible near-infrared broadband absorber, comprising the following steps:

(1) Designing satisfactory film system through optimization of thickness of each film layer based on specified requirements for bandwidth and absorption rate of the absorber; such step can be realized via existing software;

(2) Putting the substrate into acetone solution for ultrasonic cleaning and cleaning it with ethanol; then, putting the substrate into ethanol solution for ultrasonic cleaning and cleaning it with deionized water; finally, putting the substrate into deionized water for ultrasonic cleaning and cleaning it with deionized water again;

(3) Depositing each film layer by means of vacuum coating and obtaining the visible near-infrared ultra-broadband absorber.

It is preferred that the duration of each ultrasonic cleaning in Step (2) is normally 5-30 min and it is further preferred as 5-10 min.

Compared with the traditional absorbers, the visible near-infrared ultra-broadband absorber of the present invention has wider absorption band, better absorption performance and good incidence angle insensitivity. Therefore, the visible near-infrared broadband absorber of the present invention has fully surpassed traditional absorbers. Since the visible near-infrared broadband absorber of the present invention has a compact multilayer film structure that is simpler compared with the conventional broadband absorbers and artificial electromagnetic absorbers proposed in recent years. Owing to such compact multilayer film structure, the visible near-infrared broadband absorber of the present invention has avoided such complicated nano-fabrication techniques as electron beam machining technique, focused ion beam etching technique, reaction ion etching technique and lithography. Therefore, it can significantly reduce production cost and shorten the production cycle, which is convenient for large-scale mass production.

The present invention has established a broadband opaque anti-reflection structure based on blocking effect of the metal absorbing layer and broadband anti-reflection film stack on the germanium layer; therefore, it has realized visible near-infrared ultra-broadband absorption with high efficiency and angle insensitivity. The visible near-infrared ultra-broadband absorber in the present invention has simple structure, conveneint preparation and low cost, which is suitable for large-scale mass production, so that the preparation cost of the visible near-infrared ultra-broadband absorber has been significantly reduced. Therefore, the present invention is expected to have an extensive application in photo-thermal conversion, electromagnetic absorption, exploration and imaging so as to make great contribution to China's national economy, social development, science and technology, national defense construction and other fields.

BRIEF DESCRIPTION OF DRAWINGS

FIG. 4 (a) shows the absorption spectrum of the absorber sample prepared in embodiment 1, in which the wave band is 400 nm-1200 nm and the average absorption rate is over 98.75%;

FIG. 4 (b) shows the absorption spectrum of the absorber sample prepared in embodiment 2, in which the wave band is 400 nm-2000 nm, and the average absorption rate is over 97.75%;

FIG. 4 (c) shows the absorption spectrum of the absorber sample prepared in embodiment 3, in which the wave band is 400 nm-1200 nm and the average absorption rate is over 99%;

FIG. 4 (d) shows the absorption spectrum of the absorber sample prepared in embodiment 4, in which the wave band is 400 nm-2000 nm and the average absorption rate is over 96.2%;

FIG. 4 (e) shows the absorption spectrum of the absorber sample prepared in embodiment 5, in which the wave band is 400 nm-1200 nm and the average absorption rate is over 98.8%;

FIG. 4 (f) shows the absorption spectrum of the absorber sample prepared in embodiment 6, in which the wave band is 400 nm-2000 nm and the average absorption rate is over 95.2%;

PREFERRED EMBODIMENTS

The following is the detailed description of the present invention based on drawings.

Figure 1:
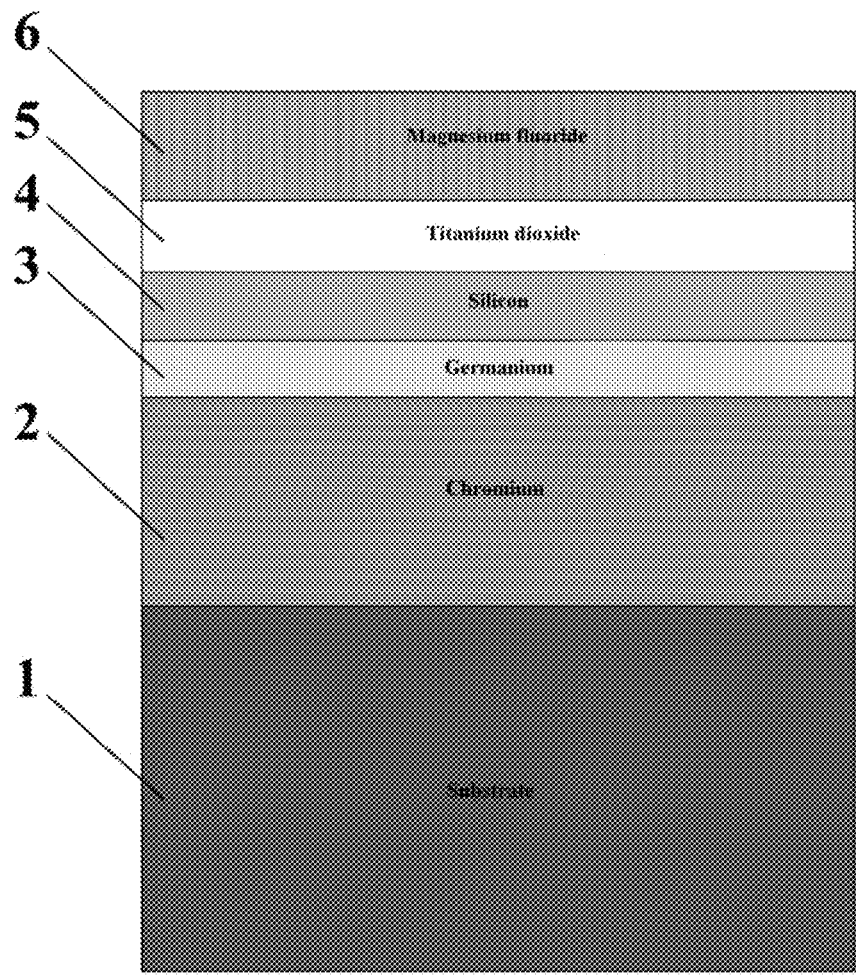
FIG. 1 shows the structural diagram for the visible near-infrared ultra-broadband absorber of the present invention.

The First Structure:

A visible near-infrared ultra-broadband absorber as shown in FIG. 1, comprises a substrate 1 and a five-layer film. The material of the substrate 1 is not limited and it can be selected from K9, fused silica, float glass and other glass materials, or such semiconducting materials as silicon and gallium arsenide. The bottom film is a metal absorbing layer 2 with the thickness greater than or equal to 100 nm to prevent the incident light into the substrate; the germanium layer 3 is on the top of the metal absorbing layer with a thickness of 10 nm-40nm and a three-layer film (4-6) on the top of the germanium layer with gradually decreasing refractive indexes from the bottom to the top, which can be treated as the broadband anti-reflection layers for germanium. The metal absorbing layer 2 can be selected from chromium, titanium, iridium, tungsten, nickel and their alloy, and it is preferred to be chromium in the present invention. The three-layer broadband anti-reflection stack (4-6) has gradually decreasing refractive indexes from the bottom to the top and the film layer 4 close to the germanium layer 3 is silicon with a thickness of 10 nm-40 nm; the intermediate layer 5 can be selected from such high refractive index medium materials as titanium dioxide, hafnium oxide, tantalum oxide and silicon nitride with a thickness of 30 nm-80 nm; and the outmost layer 6 can be selected from such low refractive index dielectric materials as magnesium fluoride, silicon dioxide and yttrium fluoride with a thickness of 70 nm-130 nm. The three-layer broadband anti-reflection multilayer stack of the present invention is preferred to be selected from silicon, titanium dioxide and magnesium fluoride.

Figure 2:
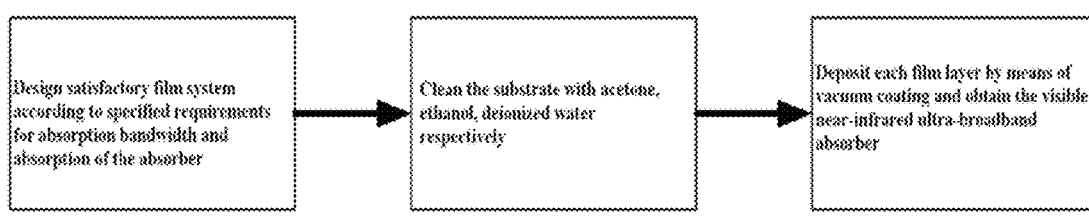
FIG. 2 shows the preparation flowchart of the visible near-infrared ultra-broadband absorber of the present invention.
Figure 3:
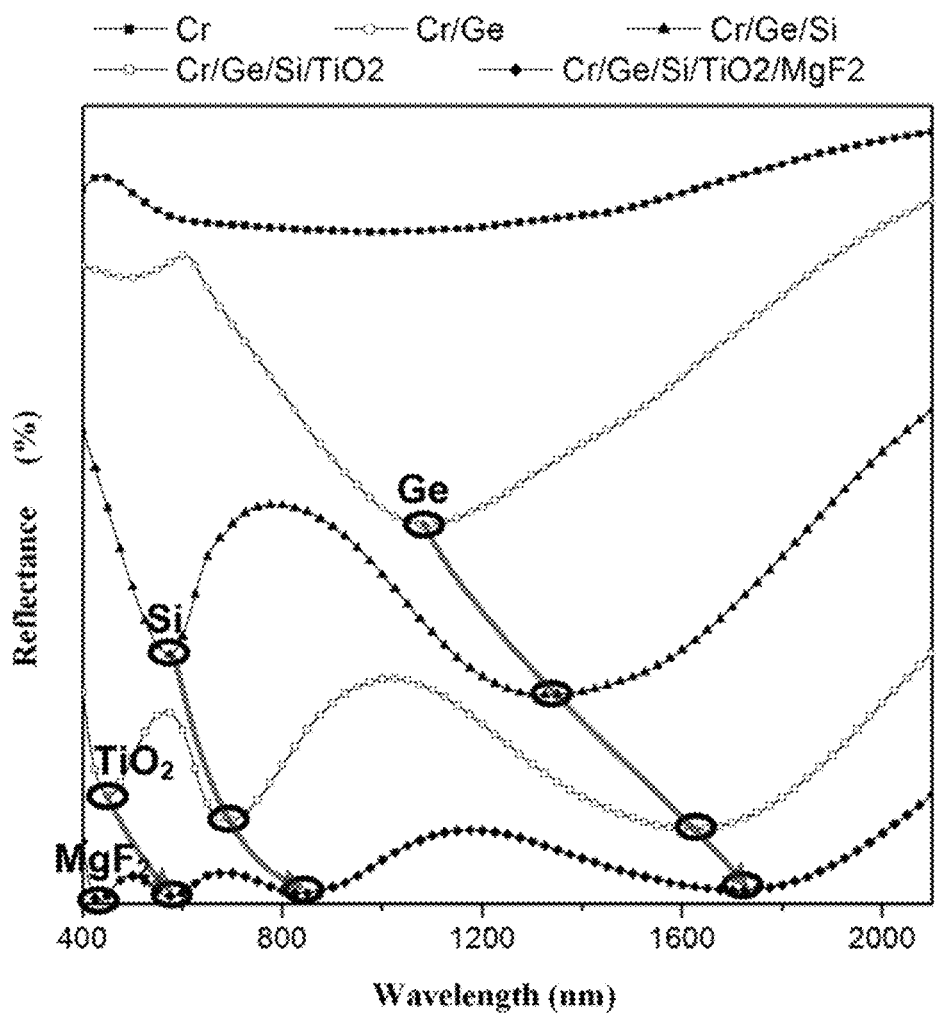
FIG. 3 shows the mechanism analysis chart for the visible near-infrared ultra-broadband absorber as shown in the preparation chart FIG. 1 of the present invention.

A preparation method for the visible near-infrared ultra-broadband absorber, comprises the following steps as shown in FIG. 2:

1) Designing satisfactory multilayer stack through optimization of the thickness of each film layer based on the specified requirements on bandwidth and absorption of the absorber;

2) Putting the substrate into acetone solution for ultrasonic cleaning for 8 minutes and cleaning it with ethanol; then, put the substrate (base) into ethanol solution for ultrasonic cleaning for 8 minutes and cleaning it with deionized water; finally, putting the substrate into deionized water for ultrasonic cleaning for 8 minutes and cleaning it with deionized water again;

3) Depositing each film layer by means of vacuum coating and obtaining the visible near-infrared ultra-broadband absorber;

A visible near-infrared ultra-broadband absorber of the present invention is based on the mechanism that makes use of the several resonances overlap of three anti-reflection layers with graded index. As shown in FIG. 3, along with the accumulation of film layer, original resonance reflection valley moves towards long-wave direction; meanwhile, a resonance reflection valley corresponding to the film layer occurs in the short-wave region. Moreover, along with the accumulation of film layer, refractive index of the outmost layer is in gradual reduction to form a film system of graded index stack with anti-reflection property; as a result of it, absorption has been enhanced accompanied by continuous reduction of overall reflection. Therefore, the structure of a visible near-infrared broadband absorber of the present invention serves as the underlying cause for the formation of broadband absorption.

Preferred Embodiments:

Embodiment 1: The visible near-infrared ultra-broadband absorber has the anticipated absorption bandwidth of 400 nm-1200 nm with average absorption rate over 98%; the absorption spectrum of the designed and prepared absorber sample of the present invention is as shown in FIG. 4(a) with average absorption rate over 98.75%; corresponding substrate material is silicon and material of corresponding film layer is chromium, germanium, silicon, titanium dioxide and magnesium fluoride respectively with a thickness of 200 nm (chromium), 18 nm (germanium), 19 nm (silicon), 35 nm (titanium dioxide) and 80 nm (magnesium fluoride) respectively.

Embodiment 2: The visible near-infrared ultra-broadband absorber has the anticipated absorption bandwidth of 400 nm-2000 nm with absorption rate per wavelength over 90%; the absorption spectrum of the designed and prepared absorber sample of the present invention is as shown in FIG. 4(b) with average absorption rate over 97.75%; corresponding substrate material is silicon and material of corresponding film layer is chromium, germanium, silicon, titanium dioxide and magnesium fluoride respectively and a thickness 200 nm (chromium), 33 nm (germanium), 32 nm (silicon), 56 nm (titanium dioxide) and 118 nm (magnesium fluoride) respectively.

Embodiment 3: It is basically identical to Embodiment 1; the only difference is that chromium is replaced by titanium and other conditions are identical to Embodiment 1; the designed absorption spectrum of the present invention is as shown in FIG. 4(c) with average absorption rate over 99% and thickness of corresponding film layer of 200 nm (titanium), 12 nm (germanium), 17 nm (silicon), 38 nm (titanium dioxide) and 89 nm (magnesium fluoride) respectively.

Embodiment 4: It is basically identical to Embodiment 2; the only difference is that chromium is replaced by titanium and other conditions are identical to Embodiment 2; the designed absorption spectrum of the present invention is as shown in FIG. 4(d) with average absorption rate over 96.2% and thickness of corresponding film layer of 200 nm (titanium), 23 nm (germanium), 31 nm (silicon), 55 nm (titanium dioxide) and 119 nm (magnesium fluoride) respectively.

Embodiment 5: It is basically identical to Embodiment 1; the only difference is that titanium oxide is replaced by tantalum oxide and other conditions are identical to Embodiment 1; the designed absorption spectrum of the present invention is as shown in FIG. 4(e) with average absorption rate over 98.8% and thickness of corresponding film layer of 200 nm (chromium), 18 nm (germanium), 21 nm (silicon), 48 nm (tantalum oxide) and 101 nm (magnesium fluoride) respectively.

Figure 4:
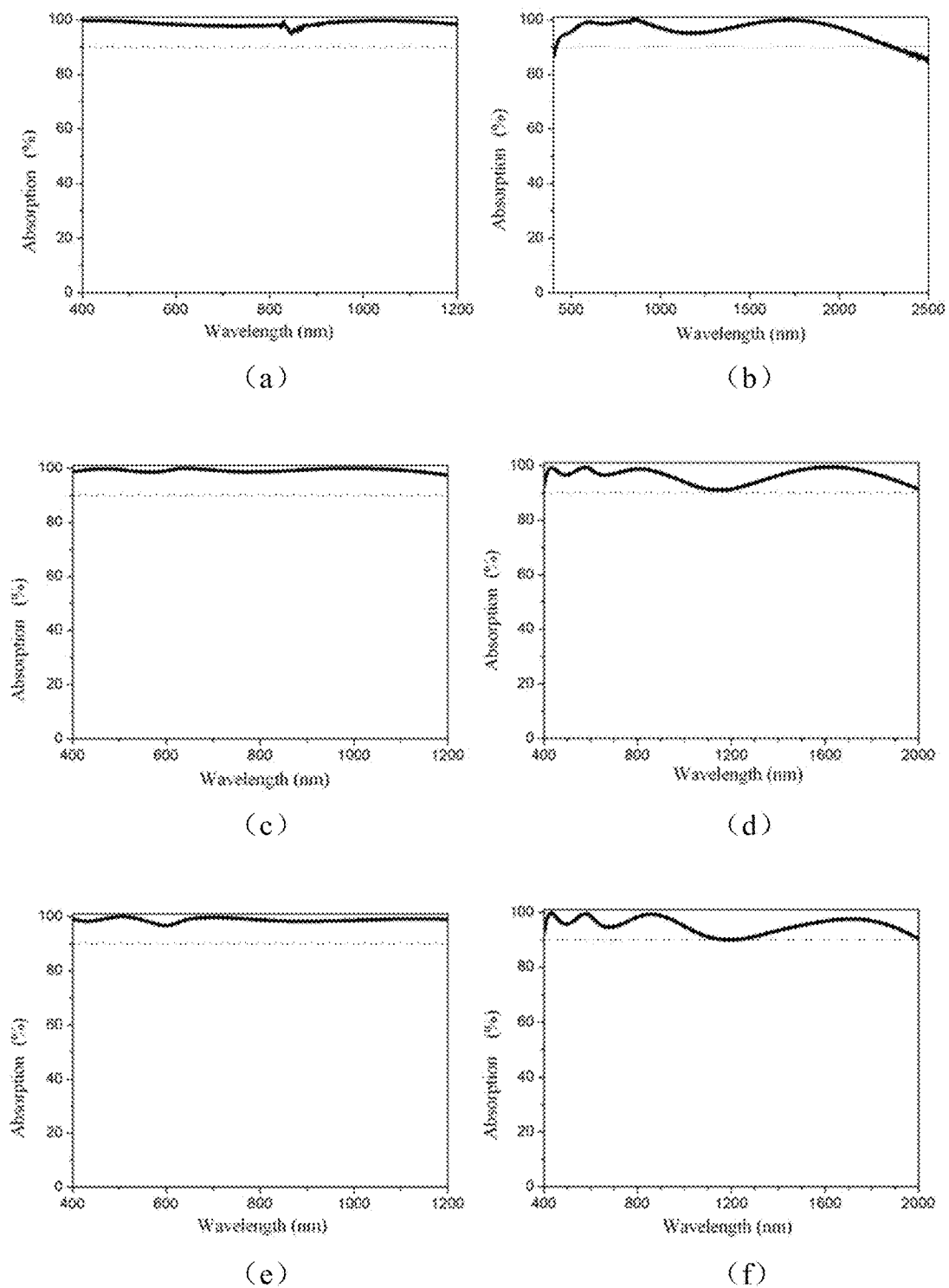
FIG. 4 shows the absorption spectrums for samples with different requirements on bandwidth and absorption.

Embodiment 6: It is basically identical to Embodiment 2; the only difference is that magnesium fluoride is replaced by silicon dioxide and other conditions are identical to Embodiment 2; the designed absorption spectrum of the present invention is as shown in FIG. 4 (f) with average absorption rate over 95.2% and thickness of corresponding film layer of 200 nm (chromium), 32 nm (germanium), 33 nm (silicon), 56 nm (titanium dioxide) and 111 nm (silicon dioxide) respectively.

The Second Structure

Figure 5:
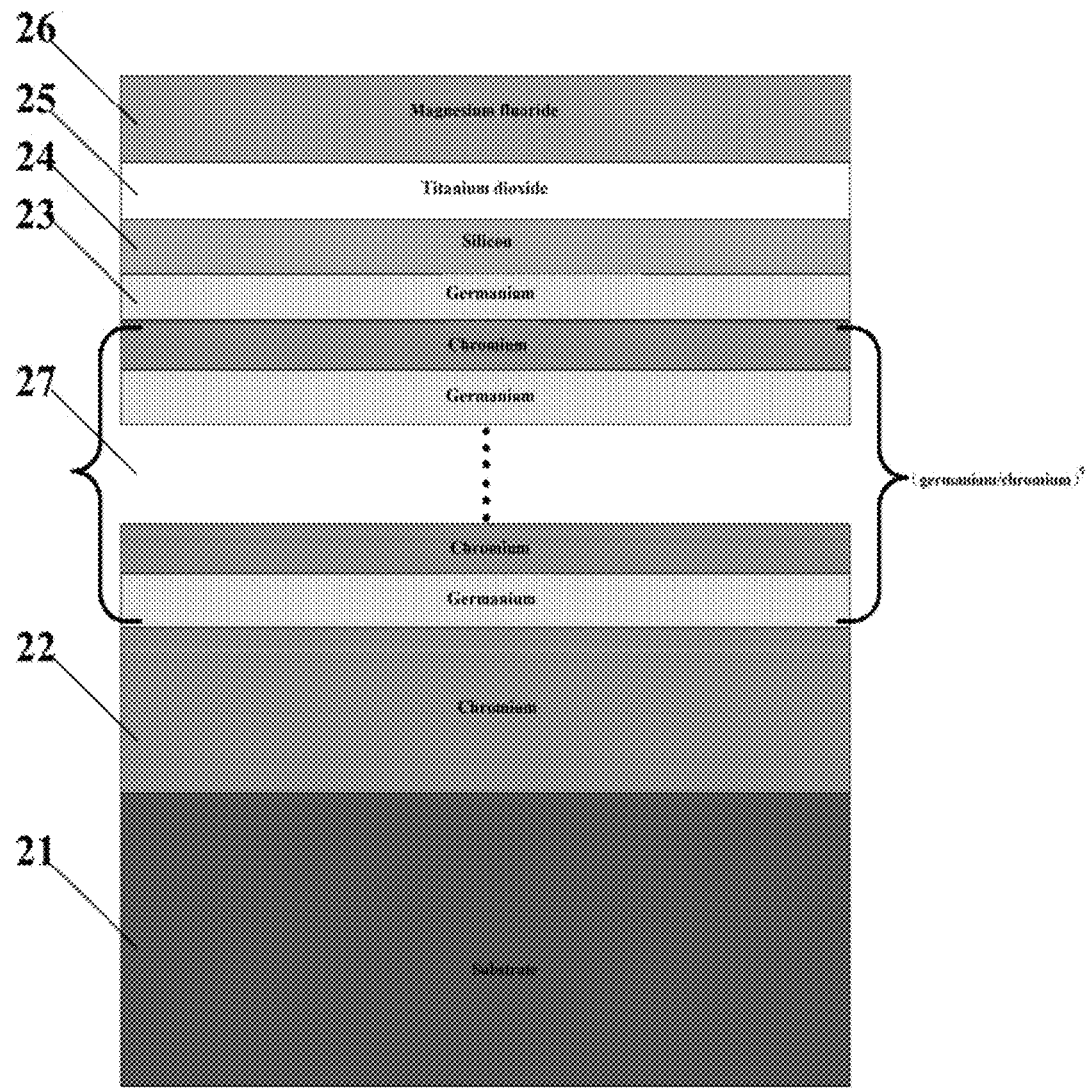
FIG. 5 shows the structural diagram for another embodiment of the visible near-infrared ultra-broadband absorber of the present invention.

A visible near-infrared ultra-broadband absorber as shown in FIG. 5, comprises a substrate 21 and a five-layer film; Material of the substrate 21 is not limited and it can be selected from such glass materials as K9, fused silica and float glass, or such semiconducting materials as silicon and gallium arsenide. The bottom film is a bottom metal absorbing layer 22 with a thickness greater than or equal to 100 nm to prevent the incident light into the substrate; the alternating film layer 27 for the germanium/metal absorbing layer is on the top of the bottom metal absorbing layer with a thickness of 10 nm-70nm; and a top germanium layer 23 is provided on the top of the alternating layer for the germanium/metal absorbing layer with a thickness of 10 nm-40 nm; and a three-layer film (marked as 24-26 in FIG. 5) is provided on the top of the top germanium layer with gradually decreasing refractive indexes from the bottom to the top, and such three layers can be treated as the broadband anti-reflection layer for germanium. The material of the bottom metal absorbing layer 22 can be selected from chromium, titanium, iridium, tungsten, nickel and their alloy and it is preferred to be chromium in the present invention. In the alternating layer 27 for the germanium/metal absorbing layer, the material of the germanium layer and the top germanium layer is identical, and the material of the metal absorbing layer is identical to that of the bottom metal absorbing layer 22. The three-layer broadband anti-reflection stack (24-26) has gradually decreasing refractive indexes from the bottom to the top and the bottom layer 24 close to the top germanium layer 23 is silicon with a thickness of 10 nm-40 nm; the intermediate layer 25 can be selected from such high refractive index medium materials as titanium dioxide, hafnium oxide, tantalum oxide and silicon nitride with a thickness of 30 nm-80 nm; the outmost layer 26 can be selected from such low refractive index medium materials as magnesium fluoride, silicon dioxide and yttrium fluoride with a thickness of 70 nm-130 nm. The three-layer broadband anti-reflection film layer of the present invention is preferred to be selected from silicon, titanium dioxide and magnesium fluoride.

Figure 6:
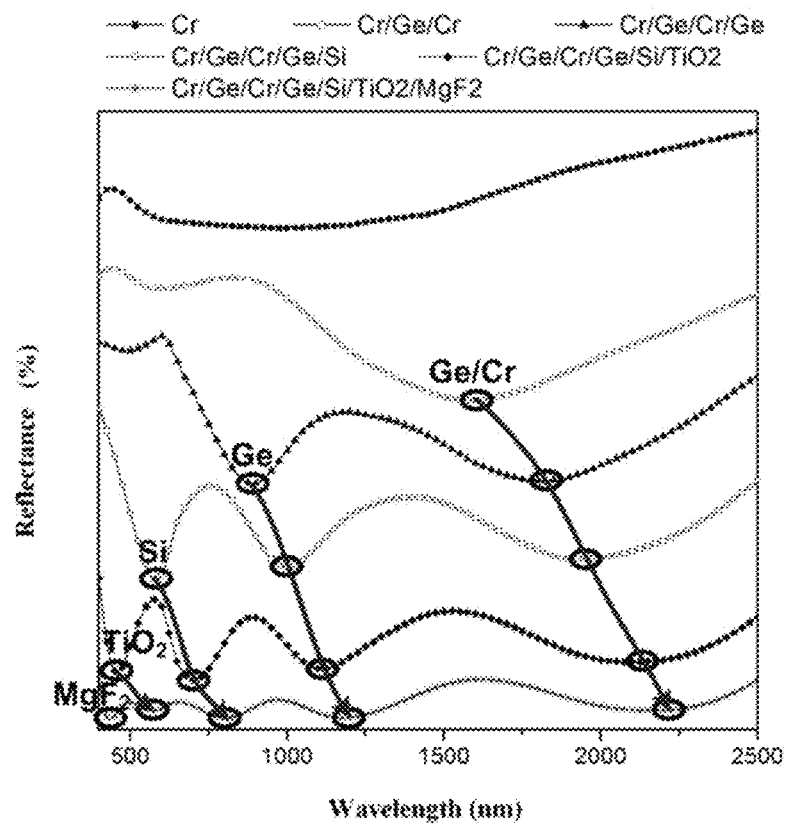
FIG. 6 shows the absorption mechanism analysis chart for the visible near-infrared ultra-broadband absorber as shown in the preparation chart FIG. 5 of the present invention.

The method in Embodiment 1 can be introduced into this embodiment as shown in FIG. 2, comprising:

1) Designing satisfactory multilayer stack through optimization of the thickness of each film layer based on specified requirements on bandwidth and absorption rate of the absorber;

2) Putting the substrate into acetone solution for ultrasonic cleaning for 8 minutes and cleaning it with ethanol; then, putting the substrate into ethanol solution for ultrasonic cleaning for 8 minutes and cleaning it with deionized water; finally, putting the substrate into deionized water for ultrasonic cleaning for 8 minutes and cleaning it with deionized water again;

3) Depositing each film layer by means of vacuum coating and obtaining the visible near-infrared ultra-broadband absorber;

A visible near-infrared ultra-broadband absorber of the present invention is based on the mechanism that makes use of the several resonances overlap of three anti-reflection layers with graded index. As shown in FIG. 6, along with the accumulation of film layer, original resonance reflection valley move towards long-wave direction; meanwhile, a resonance reflection valley corresponding to the film layer occurs in the short-wave region. Moreover, along with the accumulation of film layer, refractive index of the outmost layer is in gradual reduction to form a film system of graded index stack with anti-reflection property; as a result of it, absorption has been enhanced accompanied by continuous reduction of overall reflection. Therefore, the structure of a visible near-infrared broadband absorber of the present invention serves as the underlying cause for the formation of broadband absorption.

Figure 7:
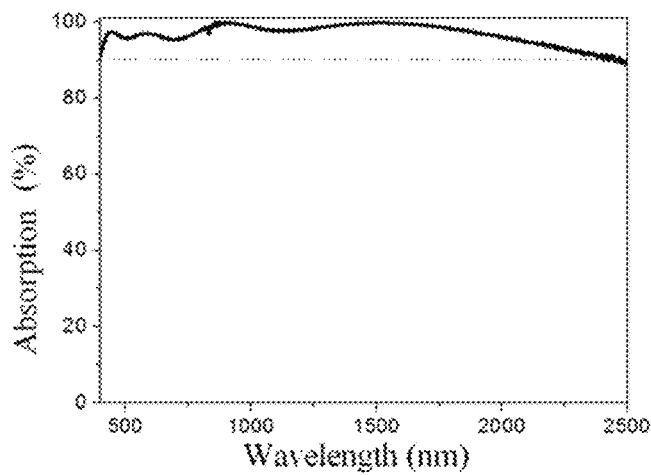
FIG. 7 shows the absorption spectrum for the 7-layer Cr/Ge/Cr/Ge/Si/TiO$_2$/MgF$_2$ film structure prepared in embodiment 7 with S=1.

Preferred Embodiments:

Embodiment 7: The visible near-infrared ultra-broadband absorber has the anticipated absorption bandwidth of 400 nm-2500 nm with average absorption rate per wavelength over 90%; the absorption spectrum of the designed and prepared absorber sample of the present invention is as shown in FIG. 7 with average absorption rate over 96.82% and corresponding structure of 7-layer Cr/Ge/Cr/Ge/Si/$TiO_2$/$MgF_2$ film structure with S=1; corresponding substrate material is silicon wafer; and the thickness of corresponding film layer from the bottom to the top is 200 nm (chromium), 52 nm (germanium), 21 nm (chromium), 33 nm (germanium), 34 nm (silicon), 57 nm (titanium dioxide) and 111 nm (magnesium fluoride) respectively.

Figure 8:
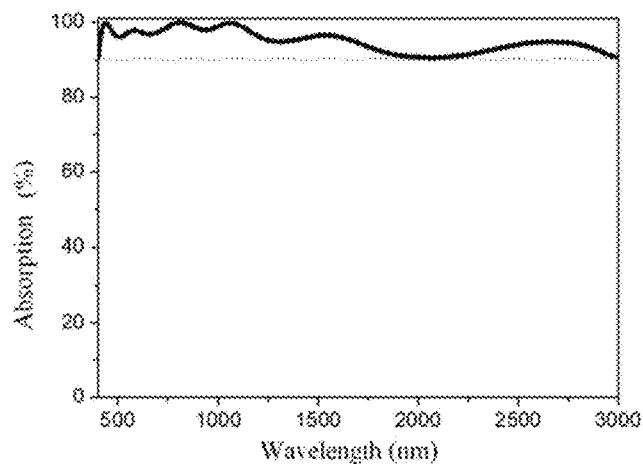
FIG. 8 shows the absorption spectrum for the 9-layer Cr/Ge/Cr/Ge/Cr/Ge/Si/TiO$_2$/MgF$_2$ film structure prepared in embodiment 8 with S=2.

Embodiment 8: The visible near-infrared ultra-broadband absorber has the anticipated absorption bandwidth of 400 nm-3000 nm with average absorption rate per wavelength over 90%; the absorption spectrum of the designed and prepared absorber sample of the present invention is as shown in FIG. 8 with average absorption rate over 94.9% and corresponding structure is 9-layer Cr/Ge/Cr/Ge/Cr/Ge/Si/$TiO_2$/$MgF_2$ film structure with S=2; corresponding substrate material is silicon wafer; and the thickness of corresponding film layer from the bottom to the top is 200 m (chromium), 72 nm (germanium) 22 nm (chromium), 55 nm (germanium), 15 nm (chromium), 36 nm (germanium), 37 nm (silicon), 57 nm (titanium dioxide) and 110 nm (magnesium fluoride) respectively.

Figure 9:
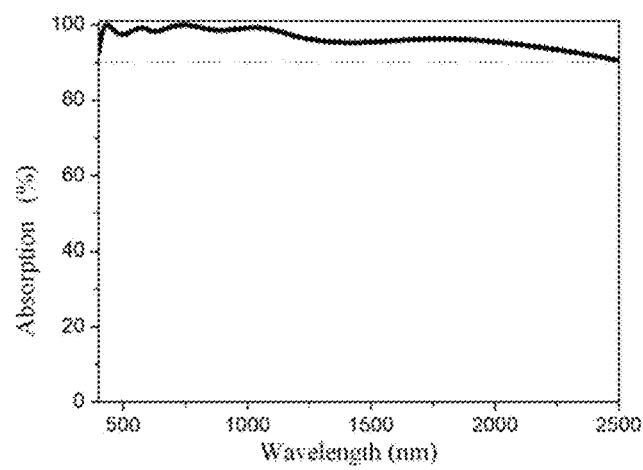
FIG. 9 shows the absorption spectrum for the 7-layer Ti/Ge/Ti/Ge/Si/TiO$_2$/MgF$_2$ film structure prepared in embodiment 9 with S=1.

Embodiment 9: It is basically identical to Embodiment 7; the only difference is that chromium is replaced by titanium and other conditions are identical to Embodiment 7; the absorption spectrum of the designed and prepared absorber sample of the present invention is as shown in FIG. 9 with average absorption rate over 96.36% and corresponding film layer thickness from the bottom to the top is 200 nm (titanium), 33 nm (germanium), 25 nm (titanium), 23 nm (germanium), 34 nm (silicon), 56 nm (titanium dioxide) and 111 nm (magnesium fluoride) respectively.

Figure 10:
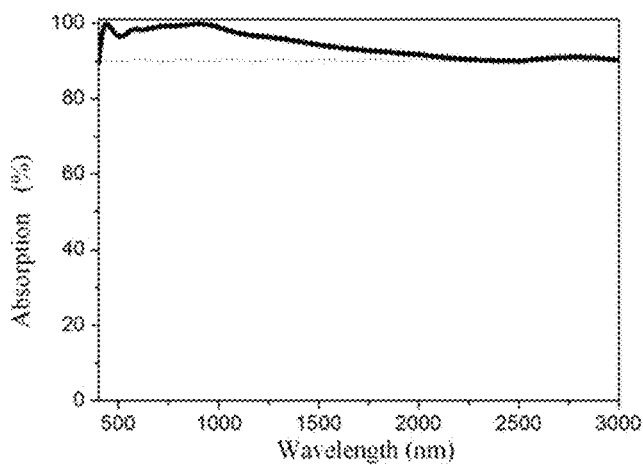
FIG. 10 shows the absorption spectrum for the 9-layer Ti/Ge/Ti/Ge/Ti/Ge/Si/TiO$_2$/MgF$_2$ film structure prepared in embodiment 10 with S=2.

Embodiment 10: It is basically identical to Embodiment 8; the only difference is that chromium is replaced by titanium and other conditions are identical to Embodiment 8; the absorption spectrum of the designed and prepared absorber sample of the present invention is as shown in FIG. 10 with average absorption rate over 96.36%; and corresponding film layer thickness from the bottom to top is 200 nm (titanium), 36 nm (germanium), 29 nm (titanium), 34 nm (germanium), 18 nm (titanium), 27 nm (germanium), 38 nm (silicon), 57 nm (titanium dioxide) and 110 nm (magnesium fluoride) respectively.

Figure 11:
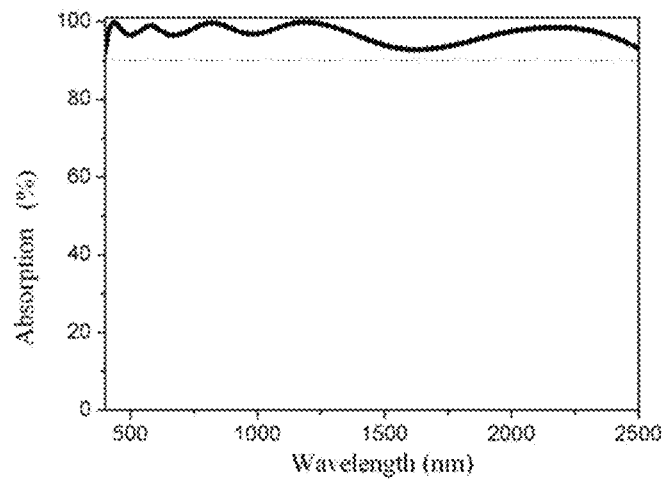
FIG. 11 shows the absorption spectrum for the 7-layer Cr/Ge/Cr/Ge/Si/Ta$_2$O$_5$/MgF$_2$ film structure prepared in embodiment 11 with S=1.

Embodiment 11: It is basically identical to Embodiment 7; the only difference is that titanium dioxide is replaced by tantalum oxide and other conditions are identical to Embodiment 7; the absorption spectrum of the designed and prepared absorber sample of the present invention is as shown in FIG. 11 with average absorption rate over 96.91% and corresponding film layer thickness from the bottom to the top is 200 nm (chromium), 53 nm (germanium), 20 nm (chromium), 33 (germanium), 35 nm (silicon), 60 nm (tantalum oxide) and 114 nm (magnesium fluoride) respectively.

Figure 12:
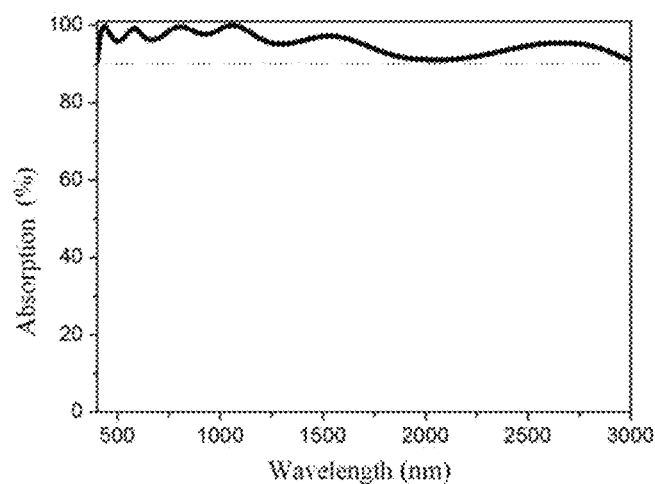
FIG. 12 shows the absorption spectrum for the 9-layer Cr/Ge/Cr/Ge/Cr/Ge/Si/TiO$_2$/SiO$_2$ film structure prepared in embodiment 12 with S=2.

Embodiment 12: It is basically identical to Embodiment 8; the only difference is that magnesium fluoride is replaced by silicon dioxide; and other conditions are identical to Embodiment 8; the absorption spectrum of the designed and prepared absorber sample of the present invention is as shown in FIG. 12 with average absorption rate over 95.28% and corresponding film layer thickness from the bottom to the top is 200 nm (chromium), 74 nm (germanium), 22 nm (chromium), 51 nm (germanium), 14 nm (chromium), 34 nm (germanium), 36 m (silicon), 58 nm (titanium dioxide) and 105 nm (silicon dioxide) respectively.

The invention claimed is:

1. A visible near-infrared ultra-broadband absorber, comprising a substrate, characterized in that a bottom metal absorbing layer, a top germanium layer and a three-layer broadband anti-reflection coating are provided sequentially above the substrate; and the three-layer broadband anti-reflection coating respectively comprises a bottom layer, an intermediate layer and an outmost layer sequentially above the top germanium layer with gradually decreasing refractive indexes; and further characterized in that an alternating film layer for the germanium/metal absorbing layer is provided between the bottom metal absorbing layer and the top germanium layer; and the alternating film layer is made up of one or several germanium/metal absorbing layer units, in which the germanium layer is arranged close to the bottom metal absorbing layer; wherein the bottom layer is silicon.

2. The visible near-infrared ultra-broadband absorber as claimed in claim 1, characterized in that the substrate is selected from K9, fused silica, float glass, silicon and gallium arsenide.

3. The visible near-infrared ultra-broadband absorber as claimed in claim 1, characterized in that the bottom metal absorbing layer is selected from chromium, titanium, iridium, tungsten, nickel and their alloy.

4. The visible near-infrared ultra-broadband absorber as claimed in claim 3, characterized in that the material of the metal absorbing layer in the alternating film layer for the germanium/metal absorbing layer is identical to that of the bottom metal absorbing layer.

5. The visible near-infrared ultra-broadband absorber as claimed in claim 1, characterized in that thickness of the bottom metal absorbing layer is greater than or equal to 100 nm.

6. The visible near-infrared ultra-broadband absorber as claimed in claim 5, characterized in that thickness of the bottom metal absorbing layer is 100 nm-500 nm.

7. The visible near-infrared ultra-broadband absorber as claimed in claim 1, characterized in that thickness of the top germanium layer is 10 nm-40 nm.

8. The visible near-infrared ultra-broadband absorber as claimed in claim 1, characterized in that thickness of each layer in the alternating film layer for the germanium/metal absorbing layer is 10 nm-80 nm.

9. The visible near-infrared ultra-broadband absorber as claimed in claim 8, characterized in that in the alternating film layer for the germanium/metal absorbing layer: thickness of the germanium layer and metal absorbing layer is 33 nm-80 nm and 10 nm-40 nm respectively.

10. The visible near-infrared ultra-broadband absorber as claimed in claim 1, characterized in that the intermediate layer is selected from titanium dioxide, hafnium oxide, tantalum oxide and silicon nitride; and the outmost layer is selected from magnesium fluoride, silicon dioxide and yttrium fluoride.

11. The visible near-infrared ultra-broadband absorber as claimed in claim 10, characterized in that thickness of the bottom layer, the intermediate layer and the outmost layer is 10 nm-40 nm, 30 nm-80 nm and 70 nm-130 nm respectively.

12. The visible near-infrared ultra-broadband absorber as claimed in claim 10, characterized in that the bottom layer, the intermediate layer and the outmost layer is silicon, titanium dioxide and magnesium fluoride respectively.

13. The visible near-infrared ultra-broadband absorber as claimed in claim 11, characterized in that the bottom layer, the intermediate layer and the outmost layer is silicon, titanium dioxide and magnesium fluoride respectively.

14. A preparation method for the visible near-infrared ultra-broadband absorber as claimed in claim 1, characterized in that the following steps are comprised:
    (1) obtaining thicknesses of each layer of film through optimal design according to specified requirements for bandwidth and absorption of the absorber, and determining satisfactory multilayer stack;
    (2) putting the substrate into acetone for ultrasonic cleaning and cleaning it with ethanol; then, putting the substrate into ethanol for ultrasonic cleaning and cleaning it with deionized water; finally, putting the substrate into deionized water for ultrasonic cleaning and cleaning it with deionized water again;
    (3) depositing each film layer with vacuum coating and obtaining the visible near-infrared ultra-broadband absorber.

15. The preparation method for the visible near-infrared ultra-broadband absorber as claimed in claim 14, characterized in that the duration of each ultrasonic cleaning in step (2) is 5-30 min.

* * * * *